United States Patent
Tamaki et al.

(10) Patent No.: US 12,212,841 B2
(45) Date of Patent: *Jan. 28, 2025

(54) INFORMATION PROCESSING DEVICE, INFORMATION PROCESSING METHOD, AND INFORMATION PROCESSING PROGRAM FOR HEAD-RELATED TRANSFER FUNCTIONS IN PHOTOGRAPHY

(71) Applicant: SONY GROUP CORPORATION, Tokyo (JP)

(72) Inventors: Hiroshi Tamaki, Tokyo (JP); Yukihiro Isono, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,277

(22) Filed: Aug. 21, 2023

(65) Prior Publication Data

US 2023/0396875 A1 Dec. 7, 2023

Related U.S. Application Data

(63) Continuation of application No. 17/638,103, filed as application No. PCT/JP2020/032355 on Aug. 27, 2020, now Pat. No. 11,770,604.

(30) Foreign Application Priority Data

Sep. 6, 2019 (JP) ................ 2019-162588

(51) Int. Cl.
*H04N 23/60* (2023.01)
*H04N 23/611* (2023.01)

(52) U.S. Cl.
CPC ........... *H04N 23/64* (2023.01); *H04N 23/611* (2023.01)

(58) Field of Classification Search
CPC .... H04N 23/64; H04N 23/611; H04N 23/634; H04N 23/635; G06V 40/165; G06V 40/172; H04S 7/30; H04S 2420/01

(Continued)

(56) References Cited

U.S. PATENT DOCUMENTS

| 6,606,458 B2 | 8/2003 | Umeda et al. |
| 8,456,536 B2 | 6/2013 | Sugino et al. |

(Continued)

FOREIGN PATENT DOCUMENTS

| CN | 101216881 | 7/2008 |
| CN | 101426087 | 5/2009 |

(Continued)

OTHER PUBLICATIONS

International Search Report and Written Opinion for International (PCT) Patent Application No. PCT/JP2020/032355, dated Oct. 27, 2020, 5 pages.

(Continued)

*Primary Examiner* — Usman A Khan
(74) *Attorney, Agent, or Firm* — Sheridan Ross PC

(57) ABSTRACT

Proposed is an information processing device, an information processing method, and an information processing program capable of improving convenience of a user regarding photographing performed for calculating a head-related transfer function. An information processing device according to the present disclosure includes: a determination unit that determines whether or not the size of an area occupied by a side face of a user in a photographing area is within a threshold value; a photographing unit that photographs the side face of the user in a case where it is determined that the size of the area occupied by the side face of the user is within the threshold value; and a photographing control unit that presents a function of manually photographing to the user in (Continued)

a case where the side face of the user has not been photographed within a predetermined period.

20 Claims, 11 Drawing Sheets

(58) Field of Classification Search
USPC ...................................................... 348/222.1
See application file for complete search history.

(56) References Cited

U.S. PATENT DOCUMENTS

| | | |
|---|---|---|
| 9,544,706 B1 | 1/2017 | Hirst |
| 2001/0019620 A1 | 9/2001 | Nagai et al. |
| 2004/0239776 A1 | 12/2004 | Shinohara et al. |
| 2010/0157129 A1 | 6/2010 | Lee |
| 2012/0133746 A1 | 5/2012 | Bigioi et al. |
| 2012/0183161 A1 | 7/2012 | Agevik et al. |
| 2013/0057713 A1 | 3/2013 | Khawand |
| 2015/0055085 A1 | 2/2015 | Fonte et al. |
| 2018/0139561 A1* | 5/2018 | Jain .......................... A61B 5/12 |
| 2018/0235463 A1 | 8/2018 | Kwon |
| 2018/0373957 A1 | 12/2018 | Lee et al. |
| 2022/0101126 A1* | 3/2022 | Bharitkar ................ H04S 7/303 |
| 2022/0294980 A1 | 9/2022 | Tamaki et al. |

FOREIGN PATENT DOCUMENTS

| | | |
|---|---|---|
| CN | 101611347 | 12/2009 |
| CN | 101753841 A | 6/2010 |
| CN | 103081455 A | 5/2013 |
| CN | 103916592 | 7/2014 |
| CN | 105227832 | 1/2016 |
| CN | 107547797 A | 1/2018 |
| CN | 107682632 | 2/2018 |
| CN | 108476358 A | 8/2018 |
| CN | 108965697 A | 12/2018 |
| CN | 109688325 A | 4/2019 |
| JP | 2008118276 A | 5/2008 |
| JP | 2009219144 A | 9/2009 |
| JP | 2014232921 A | 12/2014 |
| JP | 2015122062 A | 7/2015 |
| JP | 2018137555 A | 8/2018 |
| JP | 2019-506050 | 2/2019 |

OTHER PUBLICATIONS

Official Action for U.S. Appl. No. 17/638,103, dated Jan. 23, 2023, 24 pages.
Notice of Allowance for U.S. Appl. No. 17/638,103, dated May 17, 2023, 11 pages.
Official Action for China Patent Application No. 202080060196.7, dated Oct. 31, 2024, 16 pages.

* cited by examiner

INFORMATION PROCESSING DEVICE, INFORMATION PROCESSING METHOD, AND INFORMATION PROCESSING PROGRAM FOR HEAD-RELATED TRANSFER FUNCTIONS IN PHOTOGRAPHY

CROSS REFERENCE TO RELATED APPLICATIONS

This application a continuation of U.S. patent application Ser. No. 17/638,103, filed Feb. 24, 2022, which is a national stage application under 35 U.S.C. 371 and claims the benefit of PCT Application No. PCT/JP2020/032355, having an international filing date of 27 Aug. 2020, which designated the United States, which PCT application claimed the benefit of Japanese Patent Application No. 2019-162588, filed 6 Sep. 2019, the entire disclosures of each of which are incorporated herein by reference.

FIELD

The present disclosure relates to an information processing device, an information processing method, and an information processing program. Specifically, the present disclosure relates to the use of head-related transfer functions.

BACKGROUND

A technology of stereoscopically reproducing a sound image by a headset or the like is used by using a head-related transfer function mathematically representing how sound reaches from a sound source to the ears.

Since the head-related transfer function has large individual differences, it is desirable to use a head-related transfer function generated for each individual at the time of use. For example, there is known a technology of generating a three-dimensional digital model (hereinafter, may be referred to as a 3D model) of the head on the basis of an image obtained by photographing a pinna of a user and calculating a head-related transfer function for the user from the 3D model.

CITATION LIST

Patent Literature

Patent Literature 1: U.S. Pat. No. 9,544,706

SUMMARY

Technical Problem

According to the related art, since a head-related transfer function individually calculated for each user can be used for information processing, the sense of localization of a sound image can be enhanced.

However, in the above related art, it is difficult to improve convenience of users. For example, in the related art, a head-related transfer function is calculated using an image capturing a pinna of a user; however, since it is difficult for the user to photograph the pinna by himself or herself, it is presumed that the photographing may fail or that the photographed image may not include the pinna of an appropriate size. In this case, the user may be requested to redo the photographing many times, or the head-related transfer function may not be calculated with high accuracy.

Therefore, the present disclosure proposes an information processing device, an information processing method, and an information processing program capable of improving convenience of a user regarding photographing performed for calculating a head-related transfer function.

Solution to Problem

In order to solve the above problems, an information processing apparatus according to an embodiment of the present disclosure includes a determination unit that determines whether or not a size of an area occupied by a side face of a user in a photographing area is within a threshold value, a photographing unit that photographs the side face of the user in a case where it is determined that the size of the area occupied by the side face of the user is within the threshold value and a photographing control unit that presents a function of manually photographing to the user in a case where the side face of the user has not been photographed within a predetermined period.

DESCRIPTION OF EMBODIMENTS

Hereinafter, embodiments of the present disclosure will be described in detail on the basis of the drawings. Note that in each of the following embodiments, the same parts are denoted by the same symbols, and redundant description will be omitted.

The present disclosure will be described in the following order of items.

1. Embodiments
   1-1. Configuration of Information Processing System According to Embodiment and Example of Information Processing 1-2. Configuration of Information Processing Device According to Embodiment
1-3. Configuration of Cloud Server According to Embodiment
1-4. Procedure of Information Processing According to Embodiment
2. Modifications
3. Other Embodiments
4. Effects of Information Processing Device According to Present Disclosure
5. Hardware Configuration

1. Embodiments

Figure 1:
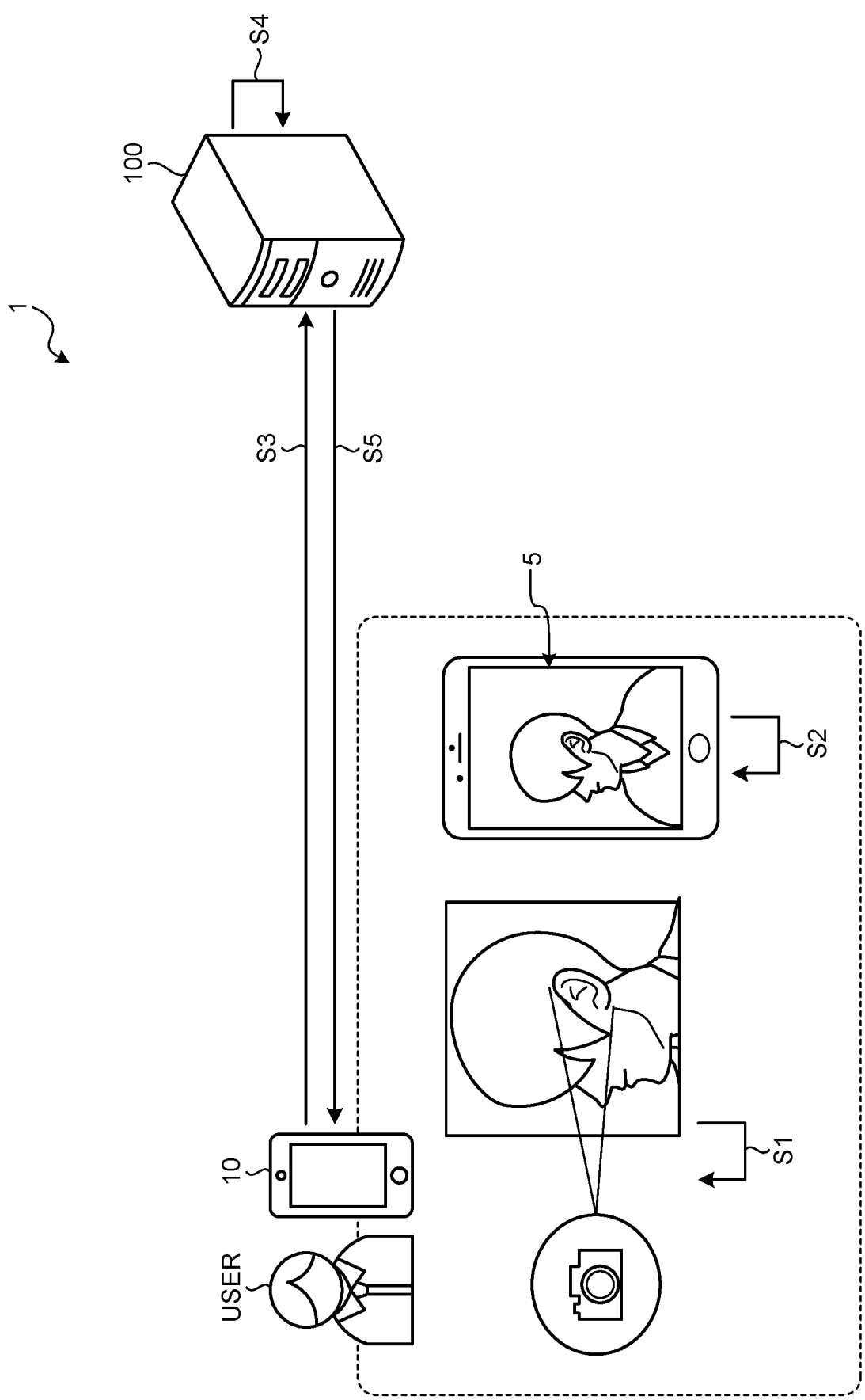
FIG. 1 is a diagram illustrating an information processing system according to an embodiment of the present disclosure.

1-1. Configuration of Information Processing System According to Embodiment and Example of Information Processing First, a configuration of an information processing system 1 according to the present disclosure and an outline of information processing executed by the information processing system 1 will be described with reference to FIGS. 1 and 2. FIG. 1 is a diagram illustrating the information processing system 1 according to an embodiment of the present disclosure. The information processing according to the embodiment of the present disclosure is implemented by the information processing system 1 illustrated in FIG. 1. As illustrated in FIG. 1, the information processing system 1 includes a user terminal 10 and a cloud server 100. The devices included in the information processing system 1 communicate with each other using a wired or wireless network (not illustrated). Note that the number of devices included in the information processing system 1 is not limited to the number of devices illustrated.

The user terminal 10 is an example of the information processing device according to the present disclosure and is an information processing terminal that executes information processing using a head-related transfer function (hereinafter, may be referred to as an HRTF). Specifically, the user terminal 10 can reproduce with highly realistic feeling or implement highly effective 3D sound by using the HRTF in reproducing music, a moving image, or the like. The user terminal 10 is implemented by, for example, a smartphone or the like having a photographing function.

The cloud server 100 calculates an HRTF corresponding to each user and provides the calculated HRTF to the user terminal 10. The cloud server 100 acquires an image obtained by photographing the user's ear from the user terminal 10 via a network and calculates an HRTF for the user on the basis of the acquired image.

As described above, the user terminal 10 executes information processing using the HRTF. The HRTF expresses, as a transfer function, a change in sound caused by surrounding objects including the shape of a pinna (ear shell) or the head of a human, and the like. In general, measurement data for deriving an HRTF is acquired by measuring an acoustic signal for measurement using a microphone, a dummy head microphone, or the like worn by a human in a pinna.

For example, an HRTF used in a technology such as 3D sound is often calculated using measurement data acquired by a dummy head microphone or the like, an average value of measurement data acquired from a large number of humans, or the like. However, since the HRTF has large individual differences, it is desirable to use the user's own HRTF in order to implement a more effective sound performance effect. That is, by replacing a general HRTF with the user's own HRTF, it becomes possible to provide the user with a sound experience with higher realistic feeling.

Conventionally, as an example of a method of calculating an HRTF of an individual user, there is a method of calculating an HRTF of a user from an image obtained by photographing the shape of an ear of the user. For example, the cloud server 100 acquires an image including the shape of an ear of the user photographed by the user terminal 10 and calculates an HRTF of the individual user on the basis of the acquired image. Then, the cloud server 100 transmits the calculated HRTF to the user terminal 10. As a result, the user terminal 10 can reproduce a sound source in which 3D audio is recorded using the HRTF of the individual user or can reproduce a moving image with realistic feeling.

However, there are several disadvantages in implementing the above approach. For example, the cloud server 100 acquires an image from which the shape of the user's ear can be recognized and calculates an HRTF on the basis of the acquired image. In this case, the user needs to capture an image including the user's own ear and to upload the photographed image to the cloud server 100. At this time, it is presumed that the user performs photographing using a smartphone like the user terminal 10 having a photographing function.

However, in a case where the user photographs a side face by himself or herself, it is difficult for the user to appropriately photograph the ear since the user cannot confirm the photographing area (that is, the screen of the user terminal 10). Therefore, even if the user photographs the side face, there is a high possibility that the ear is not included in the image or that an image in which the ear is overly inclined is be obtained. In these cases, the user may be requested to redo the photographing many times or may not be able to obtain an HRTF that is calculated with high accuracy. Furthermore, the user may have difficulty in pressing a shutter button at appropriate timing depending on the shape of the user terminal 10. In addition, in such a selfie, it is presumed that the user himself or herself photographs with the user terminal 10 in his or her hand, and thus there is a high possibility that blurring occurs in the photographed image.

As described above, there are various disadvantages regarding photographing performed to calculate an HRTF. The user terminal 10 according to the embodiment solves the above problems by information processing of the present disclosure described below. Hereinafter, an outline of information processing according to the present disclosure will be described along the flow with reference to FIGS. 1 and 2.

First, an outline of the flow of an HRTF generation process by the information processing system 1 will be described with reference to FIG. 1. As illustrated in FIG. 1, in order to acquire an image including an image of an ear of the user, the user photographs the user from a side of the head (step S1).

Figure 2:
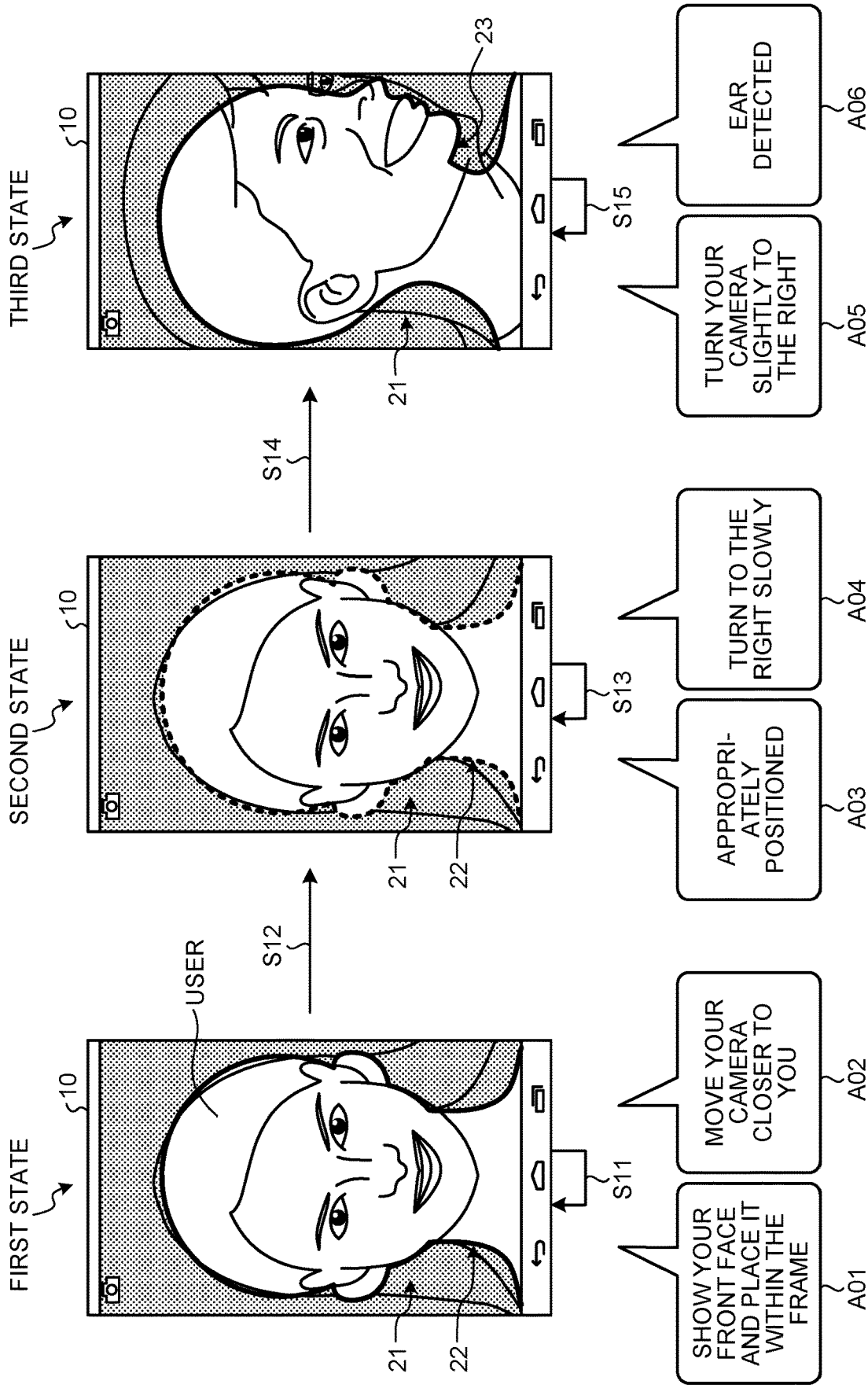
FIG. 2 is a conceptual diagram illustrating information processing according to the embodiment.

Note that detailed description of the photographing process by the user terminal 10 will be described with reference to FIG. 2. Furthermore, in the present disclosure, an image is not limited to a two-dimensional color image that can be generally photographed by the user terminal 10 or the like and may be a monochrome image, a depth image including depth information, or any combination thereof. Furthermore, the image used in the process of the present disclosure may be a plurality of images instead of one image.

The user terminal 10 acquires an image 5 which is an image obtained by photographing the side of the user's head by the photographing in step S1 and in which the shape of the user's ear can be recognized (step S2).

Subsequently, the user terminal 10 transmits the acquired image 5 to the cloud server 100 (step S3). The cloud server 100 acquires the image transmitted from the user terminal 10. Then, the cloud server 100 calculates an HRTF of the user from the image (step S4).

Note that various methods may be adopted as the method by which the cloud server 100 calculates the HRTF. For example, the cloud server 100 may calculate the HRTF by using a model learned so as to output an HRTF corresponding to an ear when a two-dimensional image including an image of the ear is input. Alternatively, the cloud server 100 may generate a 3D model of the user's head from a two-dimensional image including an image of an ear and calculate the HRTF from the generated 3D model. In addition, hereinafter, an HRTF calculated for an individual user is referred to as a personal HRTF which is distinguished from general HRTFs.

In addition, the cloud server 100 may convolve a room impulse response (RIR) into a calculated personal HRTF to generate a binaural room impulse response (BRIR). In the present specification, an HRTF includes not only the HRTF but also information such as a BRIR generated using the HRTF. For example, there are cases where data used at the time of reproducing music in the user terminal 10 is not an HRTF but a BRIR in practice; however, the two are used interchangeably below. For example, description of "transmit the calculated HRTF" also includes a situation of transmitting a calculated BRIR. In addition, description of "reproduce using an HRTF" also includes a situation of reproducing using a BRIR.

Thereafter, the cloud server 100 transmits the generated personal HRTF to the user terminal 10 (step S5). Then, the user terminal 10 acquires the personal HRTF. In this manner, the user acquires his or her personal HRTF by photographing his or her side profile and transmitting the image to the cloud server 100. Thereafter, the user terminal 10 can use the personal HRTF corresponding to the user, for example, when reproducing 3D audio or a multichannel sound source.

Next, an outline of information processing (photographing processing) according to the present disclosure by the user terminal 10 will be described with reference to FIG. 2. FIG. 2 is a conceptual diagram illustrating information processing according to the embodiment. FIG. 2 is a diagram illustrating images displayed on the screen of the user terminal 10 when the user performs selfies. In other words, the screen of the user terminal 10 illustrated in FIG. 2 indicates an area to be photographed by the user terminal 10. In the description of FIG. 2, in a case where the state transition of the user terminal 10 is illustrated, the screen display state of the user terminal 10 is described as a first state, a second state, . . . , and an N-th state (N is any number). Furthermore, in the following description, a known image recognition method may be used as appropriate as the method of recognizing the front face or the side face of the user or an ear of the user.

In a case where the user prefers to generate a personal HRTF, the user activates the photographing function and photographs the user's own ear. This photographing function is implemented by, for example, an application (hereinafter, may be simply referred to as an app) provided by a business operator that manages the cloud server 100.

In a case where the user starts the application, the user terminal 10 transitions to the first state. A photographing area 21 illustrated in FIG. 2 is an area to be imaged by the user terminal 10. In other words, the photographing area 21 displays, on the screen, a space captured by the camera included in the user terminal 10. As illustrated in FIG. 2, the user terminal 10 first outputs a voice A01 prompting the user to photograph an image of the user facing the front (step S11). For example, the user terminal 10 outputs the voice A01 with a content such as "show your front face and place it within the frame". In this manner, the user terminal 10 provides appropriate information or a feedback to the user by performing output by text-to-speech (TTS) as appropriate. Note that such a response process is not limited to voice and may be performed by a method such as vibration of vibrating the user terminal 10 or displaying a character string on the screen. Furthermore, the user terminal 10 may output, as audio, not only the TTS but also a shutter sound, a sound effect indicating that appropriate photographing has been performed, or the like.

That is, the user terminal 10 first outputs a response for adjusting the position of the front face of the user instead of prompting the user to photograph the side face immediately. In the case of an image of the front face, the user can recognize the position or the size of his or her face while holding the user terminal 10 in his or her hand. In this manner, the user terminal 10 first displays the front face of the user on the screen and performs adjustment so that the user is located at a position suitable for photographing. As a result, the user terminal 10 can improve the probability of success in the subsequent photographing of a side of the head.

In the first state, the user terminal 10 determines whether or not the position or the size of the user's face is located at a position suitable for photographing in the photographing area 21. At this time, the user terminal 10 may display, on the screen, a guide frame 22 for the user to adjust the position or the size of the front face. As a result, the user can adjust the position of the user's own face or the position of the user terminal 10 held in a hand while referring to the guide frame 22.

The user terminal 10 determines whether or not the size of the area occupied by the user's front face is within a threshold value in the photographing area 21. At this point, the user terminal 10 may output a response as appropriate in accordance with the position or the size of the user's face. For example, in a case where the size of the user's face is displayed too small with respect to the photographing area 21 or the guide frame 22, the user terminal 10 may output a voice A02 such as "Move your camera closer to you" to prompt the user to move the face or the user terminal 10 to an appropriate position.

If it is determined that the size of the area occupied by the user's front face in the photographing area 21 is within the threshold value, the user terminal 10 transitions to the second state (step S12).

In the second state, the user terminal 10 notifies the user that the position of the user's face has been positioned to a suitable point for photographing by, for example, changing the color of the guide frame 22 or outputting a voice A03 such as "Appropriately positioned" (step S13).

Subsequently, the user terminal 10 outputs a voice A04 such as "Turn to the right slowly" to prompt the user to turn to one side with respect to the camera (that is, the user terminal 10).

After outputting the voice A04, the user terminal 10 transitions to a third state (step S14). In the third state, the user terminal 10 erases the guide frame 22 and newly displays a guide frame 23 for side faces in the photographing area 21.

The user terminal 10 determines whether or not the size of the area occupied by the user's side face is within a threshold value in the photographing area 21. More specifically, the user terminal 10 determines whether or not the area including the user's ear is at an appropriate position with respect to the photographing area 21. An appropriate position means, for example, that there is no part, of the area including the ear, deviating from the end of the photographing area 21, that the proportion of the area including the ear to the photographing area 21 is within a threshold value, or that the proportion of the area including the ear to the side of the head of the user is within a threshold value. In other words, an appropriate position is a position at which the user's ear is estimated to be included in the photographed image to such an extent that there is no disadvantage for the cloud server 100 to generate the HRTF.

The user terminal 10 may output a response as appropriate in a case where the position of the side of the head or the ear of the user is inappropriate. For example, in a case where the area including the user's ear deviates from the photographing area 21 or the guide frame 23, the user terminal 10 may output a voice A05 such as "Turn your camera slightly to the right" to prompt the user to move the face or the user terminal 10 to an appropriate position.

Thereafter, in a case where it is determined that the size of the area occupied by the user's side face is within the threshold value in the photographing area 21, in other words, in a case where the area including the user's ear is at an appropriate position, the user terminal 10 outputs a voice A06 such as "Ear detected". (Step S15)

The user terminal 10 further determines whether or not a behavior amount of the user terminal 10 (for example, the acceleration or the speed of the user terminal 10 itself) is within a threshold value, whether or not the position of the user's ear that has been detected once has moved beyond a threshold value in the next frame, and the like. Then, the user terminal 10 automatically photographs one side of the head of the user in a case where the behavior amount of the user terminal 10 or the movement amount of the position of the user's ear is within the threshold value. Note that such a process is performed in order to prevent blurring in the photographed image.

The user terminal 10 may present the user with a function of manually photographing in a case where the user's side face has not been appropriately photographed. For example, the user terminal 10 presents the user with the function of manually photographing in a case where the user's side face is not appropriately photographed within a predetermined period from the start of the determination process of photographing the image of the user facing the front or the photographing process of photographing an image of the user's side face. Then, the user terminal 10 photographs an image of the user's side face by accepting an operation by the user. At this point, the user terminal 10 may display a screen including the guide frame 23 and accept manual photographing by the user. Note that a predetermined period mentioned here may be any time period such as 60 seconds or 120 seconds.

Furthermore, the user terminal 10 may accept an operation by the user such as adjusting the position of the image of the user's side face that has been manually photographed by the user. For example, the user terminal 10 receives an operation such as dragging, pinching in, or pinching out as an operation by the user and thereby adjusts the position, the size, or the like of the photographed image of the user's side face. In this manner, the user terminal 10 may accept a user's operation of adjusting the position, the size, and the like of the image of the user's side face so as to fit in a predetermined area including the ear in the guide frame 23.

Furthermore, the user terminal 10 may accept any operation by the user. For example, the user terminal 10 accepts a rotation operation as the operation by the user, thereby adjusting the inclination of the photographed image of the user's side face. In this manner, the user terminal 10 may accept a user's operation of adjusting the inclination of the image of the user's side face so as to fit in a predetermined area including the ear.

Furthermore, the user terminal 10 may present a sample image of the face turned to one side to the user depending on the operation by the user, the number of times when manual photographing has failed, or the like. By presenting the sample image, the user can easily understand what type of image of the face turned to one side should be photographed.

The user terminal 10 may adjust the predetermined period in accordance with a predetermined operation by the user. For example, the user terminal 10 may modify the predetermined period in a case of interruption of the photographing process or when the operation of returning to a previous procedure in the photographing processing is input by the user. As a specific example, in a case where the predetermined period is 60 seconds, the user terminal 10 accepts an operation of returning within 60 seconds. Then, in a case where the period until receiving the return operation has been 30 seconds, the user terminal 10 may set the predetermined period to 30 seconds. Note that, in a case where the user terminal 10 receives a predetermined operation a predetermined number of times or more, the predetermined period may be set to be short depending on the number of times of the predetermined operation.

As described above, the user terminal 10, which is an example of the information processing device according to the present disclosure, determines whether or not the size of the area occupied by the user's side face is within a threshold value in the photographing area 21 and photographs the user's side face in a case where it is determined that the size of the area occupied by the user's side face is within the threshold value. Then, in a case where the user's side face has not been photographed within the predetermined period, the user terminal 10 presents the function of manually photographing to the user.

As described above, in a case where the user terminal 10 cannot determine that the size of the area occupied by the user's side face is within the threshold value in the photographing area 21, the user terminal 10 can prompt the user to manually photograph one side of the head. With this configuration, it is possible to prevent the user terminal 10 from returning to the initial stage of the photographing process that can occur since the user's side face cannot be determined and from falling into a processing loop of determining the user's front face and side face again, and thus it is possible to reduce the trouble or the burden of the user. Therefore, the user terminal 10 can improve the convenience of the user regarding the photographing performed to calculate the head-related transfer function.

The outline of the overall flow of the information processing according to the present disclosure has been described above. Hereinafter, the configuration of the user terminal 10 will be described with reference to FIG. 3, and details of various processes will be described in order.

1-2. Configuration of Information Processing Device According to Embodiment

Figure 3:
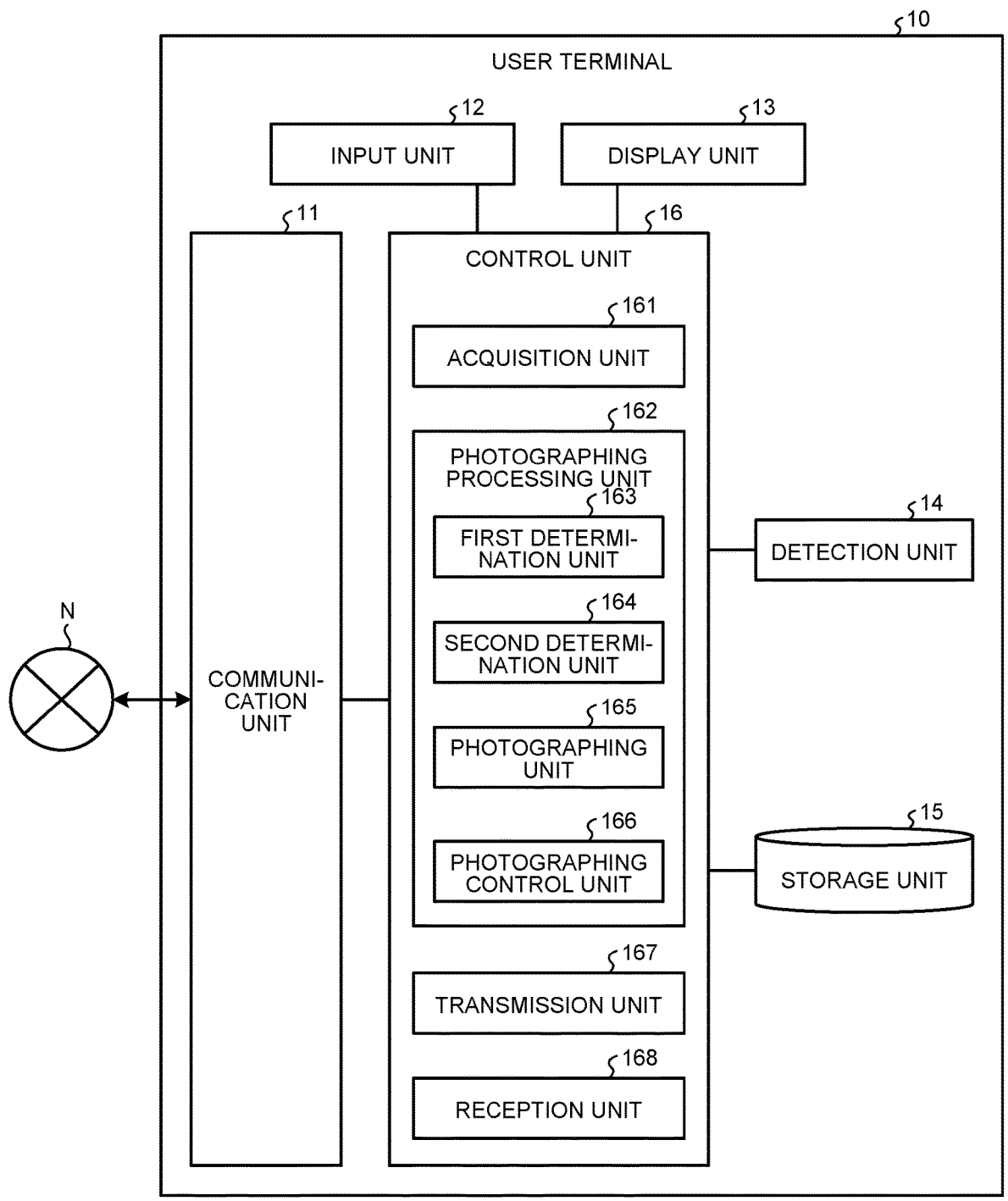
FIG. 3 is a diagram illustrating a configuration example of a user terminal according to the embodiment.

The configuration of the user terminal 10 which is an example of the information processing device according to the present disclosure will be described with reference to FIG. 3. FIG. 3 is a diagram illustrating a configuration example of the user terminal 10 according to the embodiment. As illustrated in FIG. 3, the user terminal 10 includes a communication unit 11, an input unit 12, a display unit 13, a detection unit 14, a storage unit 15, and a control unit 16.

The communication unit 11 is implemented by, for example, a network interface card (NIC) or the like. The communication unit 11 is connected with a network N (the Internet or the like) in a wired or wireless manner and transmits and receives information to and from the cloud server 100, a service server 200, a headset 50, and the like via the network N.

The input unit 12 is an input device that receives various operations from the user. For example, the input unit 12 is implemented by operation keys or the like included in the user terminal 10. The display unit 13 is a display device for displaying various types of information. For example, the display unit 13 is implemented by a liquid crystal display or the like. Note that, in a case where a touch panel is adopted for the user terminal 10, a part of the input unit 12 and the display unit 13 are integrated.

The detection unit 14 is a general term for various sensors and detects various types of information regarding the user terminal 10. Specifically, the detection unit 14 detects an operation of the user on the user terminal 10, position information of the user terminal 10, information regarding a device connected with the user terminal 10, an environment of the user terminal 10, and the like.

Furthermore, the detection unit 14 includes a lens and an image sensor for photographing as an example of sensors. That is, the detection unit 14 exerts a function as a camera, for example, in a case where the user activates an application that operates the photographing function.

Furthermore, the detection unit 14 uses various sensors and functions included in the user terminal 10 to detect information regarding the environment. For example, the detection unit 14 uses a microphone that collects sound around the user terminal 10, an illuminance sensor that detects illuminance around the user terminal 10, an acceleration sensor (or a gyro sensor or the like) or a speed sensor that detects physical movement of the user terminal 10, a geomagnetic sensor that detects a magnetic field at the location of the user terminal 10, or the like. Then, the detection unit 14 detects various types of information using various sensors.

The storage unit 15 is implemented by, for example, a semiconductor memory element such as a random access memory (RAM) or a flash memory or a storage device such as a hard disk or an optical disk. The storage unit 15 stores various types of data used for information processing.

For example, the storage unit 15 stores photographed images or the like acquired using the camera function. The storage unit 15 also stores information regarding HRTFs generated by the cloud server 100. Furthermore, the storage unit 15 may store an image recognition learned model for recognizing the front face of a user, an image recognition learned model for recognizing a side face of a user or an ear of a user, and the like.

The control unit 16 is implemented by, for example, a central processing unit (CPU), a micro processing unit (MPU), a graphics processing unit (GPU), or the like executing a program (for example, an information processing program according to the present disclosure) stored inside the user terminal 10 using a random access memory (RAM) or the like as a work area. The control unit 16 is also a controller and may be implemented by, for example, an integrated circuit such as an application specific integrated circuit (ASIC) or a field programmable gate array (FPGA).

As illustrated in FIG. 3, the control unit 16 includes an acquisition unit 161, a photographing processing unit 162, a transmission unit 167, and a reception unit 168 and implements or executes a function or an action of information processing described below. Note that the internal configuration of the control unit 16 is not limited to the configuration illustrated in FIG. 3 and may be another configuration as long as information processing described below is performed.

The acquisition unit 161 acquires various types of information. For example, the acquisition unit 161 acquires information detected by the detection unit 14. The acquisition unit 161 stores the acquired information in the storage unit 15 as appropriate.

The photographing processing unit 162 controls the photographing process of images used to generate a personal HRTF. The photographing processing unit 162 includes a first determination unit 163, a second determination unit 164 (corresponds to a determination unit), a photographing unit 165, and a photographing control unit 166, and the processing units execute the photographing process of images in cooperation with each other.

The first determination unit 163 determines whether or not the size of the area occupied by the user's front face is within a threshold value in the photographing area.

Note that the first determination unit 163 sets a first guide area for specifying an area occupied by the user's front face in the photographing area and determines whether or not the size of the area occupied by the user's front face with respect to the first guide area is within a threshold value. The first guide area corresponds to, for example, an inner portion of the guide frame 22 illustrated in FIG. 2. By setting the first guide area, the first determination unit 163 can make the user intuitively understand what size or which position the face should be captured by the camera.

Specifically, the first determination unit 163 determines whether or not the area extracted as the user's front face is included in the photographing area. The area extracted as the user's front face means, for example, an area that is recognized as a front face by using a desired image recognition model. The area extracted as the user's front face is indicated by, for example, a rectangle having a predetermined size.

For example, the first determination unit 163 determines whether or not the area extracted as the user's front face is included in the photographing area on the basis of the ratio at which the area extracted as the user's front face is included in the photographing area.

Furthermore, the first determination unit 163 may determine whether or not the area extracted as the user's front face is included in the photographing area on the basis of the distance between an end of the area extracted as the user's front face and an end of the photographing area.

Figure 4:
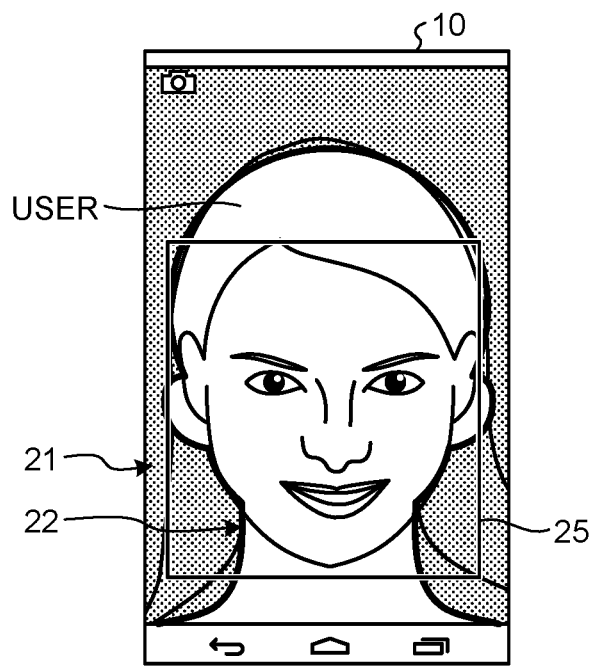
FIG. 4 is a diagram for explaining a first determination process according to the embodiment.

A process executed by the first determination unit 163 will be described with reference to FIG. 4. FIG. 4 is a diagram for explaining the first determination process according to the embodiment.

As illustrated in FIG. 4, in a case where an image of the user's front face is recognized, the first determination unit 163 extracts an area 25 as the user's front face. For example, the first determination unit 163 determines whether or not the area occupied by the area 25 is within a threshold value (such as that an area of more than 60% is occupied but not more than 90%) with respect to the photographing area 21 or the first guide area (the inner portion of the guide frame 22) and determines whether or not the user's front face is included in the photographing area 21. Note that the threshold value may be modified as appropriate, for example, in response to a request from the cloud server 100.

In addition, the first determination unit 163 determines the distance between an end of the area 25 and an end of the photographing area 21. For example, the first determination unit 163 detects the number of pixels included between an end of the area 25 and an end of the photographing area 21 and determines that the area 25 is included in the photographing area 21 in a case where pixels, of which number exceeding a predetermined number, are present.

With the above process, the first determination unit 163 can determine that the size of the user's face is extremely small or large or that the position of the user's face is out of the photographing area of the camera.

Note that, in FIG. 4, the area 25 extracted as the user's front face is expressed by a rectangle; however, the first determination unit 163 may extract the area 25 in a shape that goes along the user's front face without being limited to a rectangle. Furthermore, the area 25 may be or may not be displayed on the screen to be presented to the user.

In a case where it is determined that the size of the area occupied by the user's front face is within a threshold value, the first determination unit 163 outputs a response indicating a shift to the photographing of the user's side face. As a result, the first determination unit 163 can shift to photographing of a side face after adjusting the positional relationship between the user and the user terminal 10 (photographing device) to an appropriate one.

Specifically, the first determination unit 163 outputs at least one of voice, vibration, or display of a character string as a response. For example, the first determination unit 163 uses the TTS function to output a voice that prompts the user to turn to the right or left for photographing a side face. Alternatively, the first determination unit 163 may notify the user that the determination of the front face has completed by outputting a sound effect indicating that the determination of the front face has completed or vibrating the user terminal 10.

Furthermore, in a case where it is determined that the size of the area occupied by the user's front face is not within the threshold value, the first determination unit 163 may output a response instructing to move the position of the user's face or a response instructing to move the position of the device used for photographing the user.

Also in this case, the first determination unit 163 outputs at least one of voice, vibration, or display of a character string as a response. For example, the first determination unit 163 uses the TTS function to output a voice that prompts to bring the distance between the user and the user terminal 10 closer or farther or to move the position of the user or the user terminal 10 to the right or left.

In a case where the first determination unit 163 determines that the size of the area occupied by the user's front face is within the threshold value, the second determination unit 164 determines whether or not the size of the area occupied by the user's side face in the photographing area is within the threshold value.

Note that the second determination unit 164 may set a second guide area for specifying an area occupied by the user's front face in the photographing area and determine whether or not the size of the area occupied by the user's front face with respect to the second guide area is within a threshold value. The second guide area corresponds to, for example, an inner portion of the guide frame 23 illustrated in FIG. 2. By setting the second guide area, the second determination unit 164 can make the user intuitively understand what size or which position the face should be captured by the camera.

The second determination unit 164 determines whether or not an area including the user's ear, in the area extracted as the user's side face, is included in the photographing area and, in a case where the area including the user's ear is included in the photographing area, determines that the size of the area occupied by the user's side face is within the threshold value.

Specifically, the second determination unit 164 determines whether or not the area including the user's ear is included in the photographing area on the basis of a ratio at which the area including the user's ear is included in the photographing area.

In addition, the second determination unit 164 may determine whether or not the area including the user's ear is included in the photographing area on the basis of the ratio at which the area including the user's ear occupies in the area occupied by the user's side face.

Furthermore, the second determination unit 164 may determine whether or not the area including the user's ear is included in the photographing area on the basis of the distance between an end of the area including the user's ear and an end of the photographing area.

Figure 5:
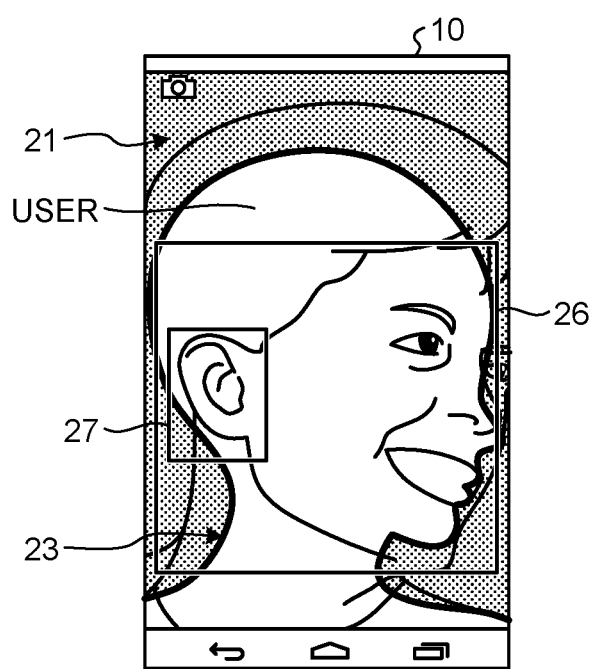
FIG. 5 is a diagram illustrating a second determination process according to the embodiment.

A process executed by the second determination unit 164 will be described with reference to FIG. 5. FIG. 5 is a diagram for explaining the second determination process according to the embodiment.

As illustrated in FIG. 5, in a case where an image of the user's side face is recognized, the second determination unit 164 extracts an area 26 as the user's side face. For example, the second determination unit 164 determines whether or not the area occupied by the area 26 is within a threshold value with respect to the photographing area 21 or the second guide area (the inner portion of the guide frame 23) and determines whether or not the user's side face is included in the photographing area 21. Note that the threshold value may be modified as appropriate, for example, in response to a request from the cloud server 100.

Furthermore, the second determination unit 164 may determine whether or not the area including the user's ear is included in the photographing area on the basis of a ratio of the area 26 occupied by the user's side face to an area 27 including the user's ear. This is because, in images used for generating an HRTF, the ratio between the size of the head of the user's side face and the size of the ear affects the accuracy of the HRTF to be generated. With such a process, the second determination unit 164 can capture an image in which the size of the user's head and the size of the ear have an appropriate relationship.

In addition, the second determination unit 164 may determine the distance between an end of the area 27 indicating the ear and an end of the photographing area 21. For example, the second determination unit 164 detects the number of pixels included between an end of the area 27 and an end of the photographing area 21 and determines that the area 27 is included in the photographing area 21 in a case where pixels, of which number exceeding a predetermined number, are present.

With the above process, the second determination unit 164 can prevent photographing an image not including an ear, and thus it is possible to reduce the burden of the user due to re-photographing or the like.

Note that, in FIG. 4, the area 26 extracted as the user's side face and the area 27 including the ear are expressed by rectangles; however, the second determination unit 164 may extract the area 26 or the area 27 in a shape that goes along the user's side face or the ear without being limited to a rectangle. Furthermore, the area 26 or the area 27 may or may not be displayed on the screen and presented to the user.

Furthermore, in a case where it is determined that the area including the user's ear, in the area extracted as the user's side face, is not included in the photographing area, the second determination unit 164 may output a response instructing to move the position of the user's face or a response instructing to move the position of the device used for photographing the user.

Specifically, the second determination unit 164 outputs at least one of voice, vibration, or display of a character string as a response. For example, the second determination unit 164 can notify the user whether or not photographing is appropriately performed in an easy-to-understand manner by a response in a mode that is easy for the user to understand without looking at the screen such as voice or vibration.

In a case where the second determination unit 164 determines that the size of the area occupied by the user's side face is within the threshold value, the photographing unit 165 photographs the user's side face. The photographing unit 165 can perform photographing at appropriate timing by automatically performing photographing in response to the determination result by the second determination unit 164 without determining whether the shutter button is pressed by the user.

Furthermore, the photographing unit 165 may photograph the user's side face in a case where the second determination unit 164 determines the size of the area occupied by the user's side face is within the threshold value and then determines that the behavior amount of the device used for photographing of the user is within the threshold value. In the embodiment, the device used for photographing the user refers to the user terminal 10. That is, the photographing unit 165 performs photographing in a case where the determination result by the second determination unit 164 is received and it is determined that the behavior amount (acceleration, speed, and the like) of the user terminal 10 is within the threshold value. As a result, the photographing unit 165 can prevent such photographing that causes blurring.

Furthermore, the photographing unit 165 may photograph the user's side face in a case where the second determination unit 164 determines that the size of the area occupied by the user's side face is within the threshold value and then determines that the movement amount of the user's side face in the photographing area is within the threshold value.

That is, the photographing unit 165 compares an image at the timing when the determination result by the second determination unit 164 is received with an image after the subsequent photographing interval, for example, an image after a predetermined number of frames and determines that the movement amount of the user's face or ear is equal to or less than the threshold value. Such a process can be performed, for example, by applying a tracking process or the like of an object in the images. The photographing unit 165 can prevent such photographing that causes blurring by performing photographing in a case where it is determined that the movement amount of the user is within the threshold value.

In addition, the photographing unit 165 may edit a photographed image and perform preprocessing before transmitting the image to the cloud server 100. For example, the photographing unit 165 may perform editing so that the area including the user's ear is positioned at the center of the image. Furthermore, the photographing unit 165 may trim an area outside a predetermined range surrounding the area including the user's ear.

In a case where the user's side face is not photographed by the photographing unit 165 within the predetermined period, the photographing control unit 166 presents the function of manually photographing to the user. Specifically, the photographing control unit 166 presents the user with the function of manually photographing in a case where the user's side face has not been appropriately photographed.

For example, the photographing control unit 166 presents the user with the function of manually photographing in a case where the user's side face is not appropriately photographed within a predetermined period from the start of the determination process of photographing the image of the user facing the front or the photographing process of photographing an image of the user's side face. Then, the photographing control unit 166 receives an operation by the user to photograph an image of the user's side face. At this point, the photographing control unit 166 may display a screen including the guide frame 23 and accept manual photographing by the user.

The transmission unit 167 transmits various types of information. For example, the transmission unit 167 transmits the images photographed by the photographing unit 165 and the photographing control unit 166 to the cloud server 100.

The reception unit 168 receives various types of information. For example, the reception unit 168 receives the personal HRTF generated by the cloud server 100.

1-3. Configuration of Cloud Server According to Embodiment

Figure 6:
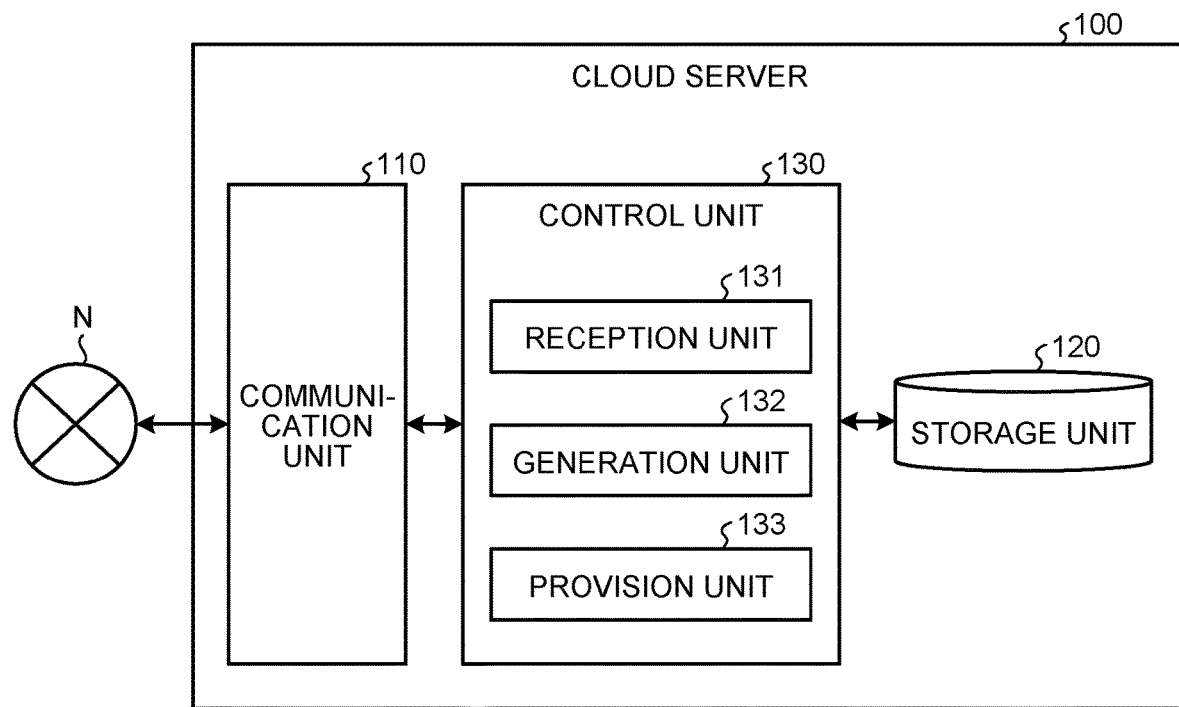
FIG. 6 is a diagram illustrating a configuration example of a cloud server according to the embodiment.

Next, a configuration of the cloud server 100 according to the embodiment will be described with reference to FIG. 6. FIG. 6 is a diagram illustrating a configuration example of the cloud server 100 according to the embodiment.

As illustrated in FIG. 6, the cloud server 100 includes a communication unit 110, a storage unit 120, and a control unit 130. Note that the cloud server 100 may include an input unit (such as a keyboard or a mouse) that receives various operations from an administrator or the like that manages the cloud server 100 and a display unit (such as a liquid crystal display) that displays various types of information.

The communication unit 110 is implemented by, for example, an NIC or the like. The communication unit 110 is connected with the network N (the Internet or the like) in a wired or wireless manner and transmits and receives information to and from the user terminal 10 and the like via the network N.

The storage unit 120 is implemented by, for example, a semiconductor memory element such as a RAM or a flash memory or a storage device such as a hard disk or an optical disk. For example, the storage unit 120 stores an image acquired from the user terminal 10 or a model (for example, a learned model having learned to output an HRTF using images as the input) used for generating (calculating) an HRTF.

The control unit 130 is implemented by, for example, a CPU, an MPU, a GPU, or the like executing a program stored in the cloud server 100 using a RAM or the like as a work area. Meanwhile, the control unit 130 is a controller and may be implemented by, for example, an integrated circuit such as an ASIC or an FPGA.

As illustrated in FIG. 6, the control unit 130 includes a reception unit 131, a generation unit 132, and a provision unit 133 and implements or executes a function or an action of the information processing described below. Note that the internal configuration of the control unit 130 is not limited to the configuration illustrated in FIG. 6 and may be another configuration as long as information processing described below is performed.

The reception unit 131 receives various types of information. For example, the reception unit 131 receives a request for HRTF generation process from the user terminal 10. The reception unit 131 also receives images used for the HRTF generation process from the user terminal 10.

The generation unit 132 generates a personal HRTF corresponding to the images on the basis of the images received by the reception unit 131. For example, the generation unit 132 generates the personal HRTF using a learned model having learned to output an HRTF using images as the input. Note that the learned model is not specified to any type, and for example, the generation unit 132 may generate the personal HRTF using various models generated using various learning algorithms such as a neural network, a support vector machine, clustering, and reinforcement learning.

Note that the generation unit 132 may transmit, to the user terminal 10, a parameter related to the photographing process performed by the user terminal 10. For example, the generation unit 132 transmits information specifying the size of an ear to be included in an image (such as "an image in which an area including an ear has a size of about 200×200 pixels") or parameters such as the acceleration or the speed of the user terminal 10 and the movement amount of the user that are acceptable in photographing.

Furthermore, the generation unit 132 may generate a learned model by learning an image that has been manually photographed as a normal example using a learning algorithm in a case where the user's side face is not photographed by the user terminal 10 within a predetermined period. Furthermore, the generation unit 132 may generate the personal HRTF using such a learned model. As described above, since the generation unit 132 can learn an image in which the user's side face is difficult to be automatically photographed as a normal example, the accuracy of the learned model can be improved.

The provision unit 133 provides the personal HRTF generated by the generation unit 132 to the user terminal 10. Note that the provision unit 133 may provide error information or the like in a case where no personal HRTF could be generated on the basis of the images received from the user terminal 10.

1-4. Procedure of Information Processing According to Embodiment

Figure 7:
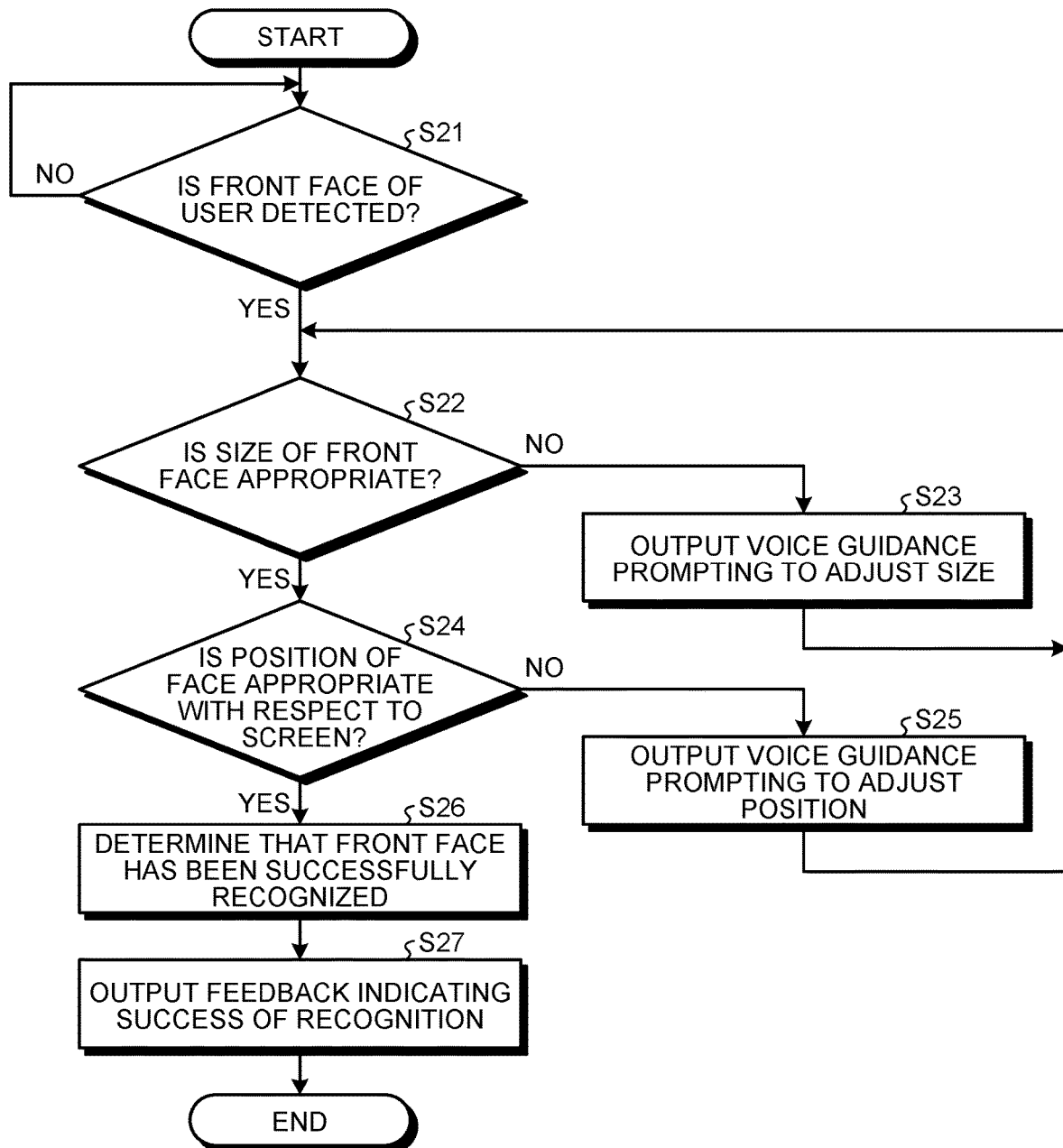
FIG. 7 is a flowchart (1) illustrating a procedure of information processing according to the embodiment.

A procedure of the information processing according to the embodiment will be described by referring to FIGS. 7 and 8. In FIG. 7, a procedure of a process in which the user terminal 10 executes the first determination process will be described. FIG. 7 is a flowchart (1) illustrating a flow of information processing according to the embodiment.

As illustrated in FIG. 7, the user terminal 10 determines whether or not the front face of a user has been detected within a viewing angle of the camera function (step S21). If the front face of the user is not detected (step S21; No), the user terminal 10 stands by until the front face of the user is detected.

On the other hand, if the front face of the user is detected (step S21; Yes), the user terminal 10 determines whether or not the size of the front face is appropriate in the photographing area (step S22).

If the size of the front face is not appropriate (step S22; No), the user terminal 10 outputs a response such as voice guidance prompting the user to adjust the size (step S23).

If the size of the user's front face is appropriate (step S22; Yes), the user terminal 10 determines whether or not the position of the face is appropriate with respect to the screen (step S24).

If the position of the front face is not appropriate (step S24; No), the user terminal 10 outputs a response such as voice guidance prompting the user to adjust the position (step S25).

If the position of the user's front face is appropriate (step S24; Yes), the user terminal 10 determines that the front face of the user has been successfully recognized (step S26). Then, the user terminal 10 outputs a feedback (such as voice or vibration) indicating that the recognition has been successful (step S27).

Next, a procedure of a process in which the user terminal 10 photographs the user's ear will be described with reference to FIG. 8. FIG. 8 is a flowchart (2) illustrating a flow of information processing according to the embodiment.

Figure 8:
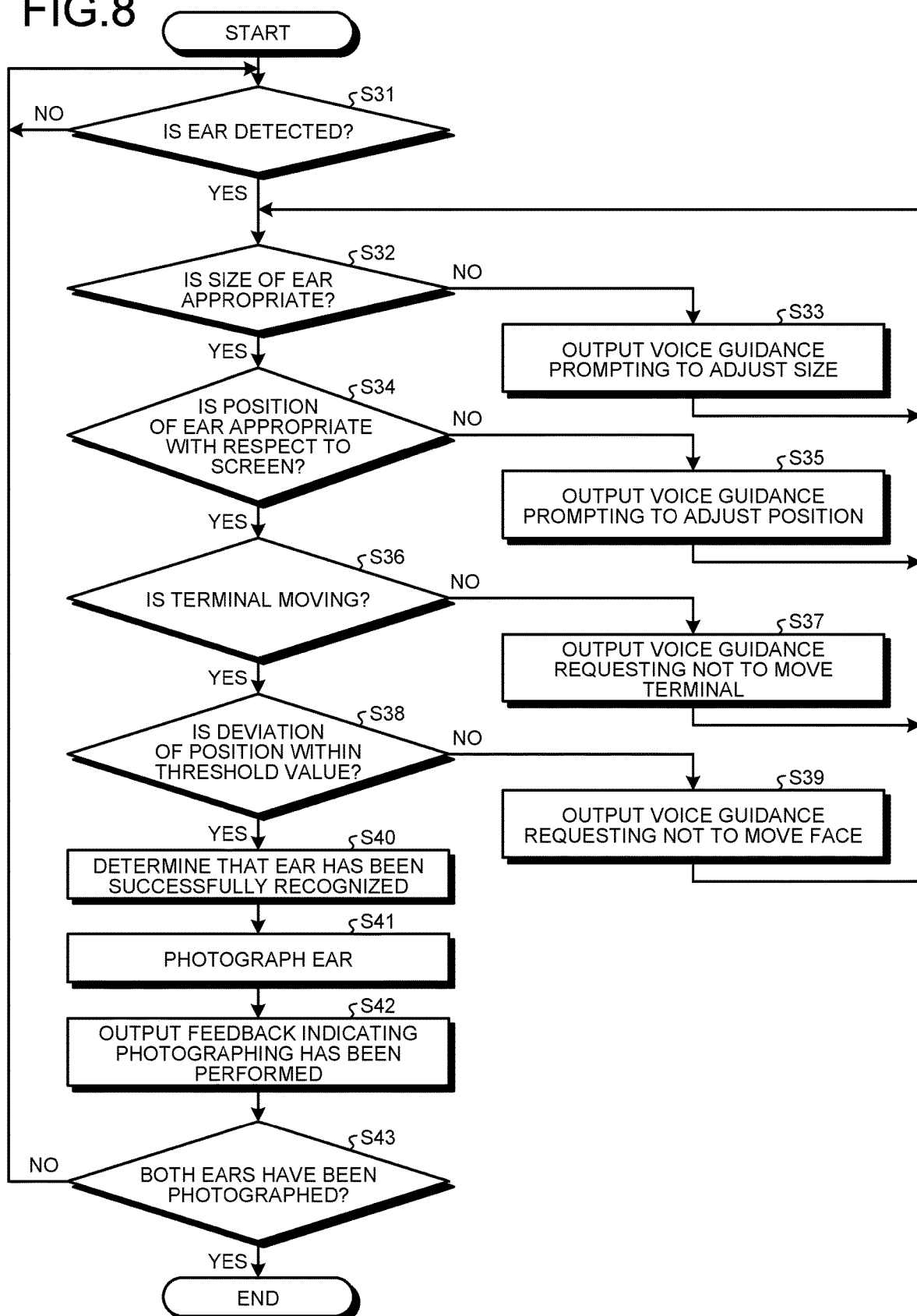
FIG. 8 is a flowchart (2) illustrating a procedure of information processing according to the embodiment.

As illustrated in FIG. 8, the user terminal 10 determines whether or not the user's ear (side face) has been detected within the viewing angle of the camera function (step S31). If the user's ear is not detected (step S31; No), the user terminal 10 stands by until the user's ear is detected.

On the other hand, if the user's ear is detected (step S31; Yes), the user terminal 10 determines whether or not the size of the ear is appropriate in the photographing area (step S32).

If the size of the ear is not appropriate (step S32; No), the user terminal 10 outputs a response such as voice guidance prompting the user to adjust the size (step S33).

If the size of the user's ear is appropriate (step S32; Yes), the user terminal 10 determines whether or not the position of the ear is appropriate with respect to the screen (step S34).

If the position of the ear is not appropriate (step S34; No), the user terminal 10 outputs a response such as voice guidance prompting the user to adjust the position of the ear (step S35).

If the position of the user's ear is appropriate (step S34; Yes), the user terminal 10 determines whether or not the user terminal 10 has moved beyond a threshold value (step S36).

If the user terminal 10 has moved exceeding the threshold value (step S36; No), the user terminal 10 outputs a response such as voice guidance prompting the user not to move the user terminal 10 (step S37).

If the user terminal 10 has not move exceeding the threshold value (step S36; Yes), the user terminal 10 determines whether or not the deviation of the positions of the user's ear or head is within the threshold value between frames to be photographed (step S38).

If the positional deviation is not within the threshold value (step S38; No), the user terminal 10 outputs a response such as voice guidance for prompting the user not to move the face (step S39).

If the positional deviation is within the threshold value (step S38; Yes), the user terminal 10 determines that the ear has been successfully recognized (step S40). Then, the user terminal 10 photographs the user's ear and acquires the photographed image (step S41).

Then, the user terminal 10 outputs feedback indicating that the ear has been photographed to the user (step S42).

Then, the user terminal 10 determines whether or not both ears have been photographed (step S43). If not both ears are photographed, that is, if only one ear has been photographed (step S43; No), the user terminal 10 repeats the process of detecting the other ear (step S31). On the other hand, if both ears have been photographed (step S43; Yes), the user terminal 10 ends the photographing process.

1-4-1. Modification of Information Processing Procedure

Next, modifications of the procedure of the information processing according to the embodiment will be described with reference to FIGS. 9 to 11. Note that, in the present description, redundant description of the same procedure as that of the information processing procedure described above with reference to FIGS. 7 and 8 will be omitted by citing the above information processing procedure.

Figure 9:
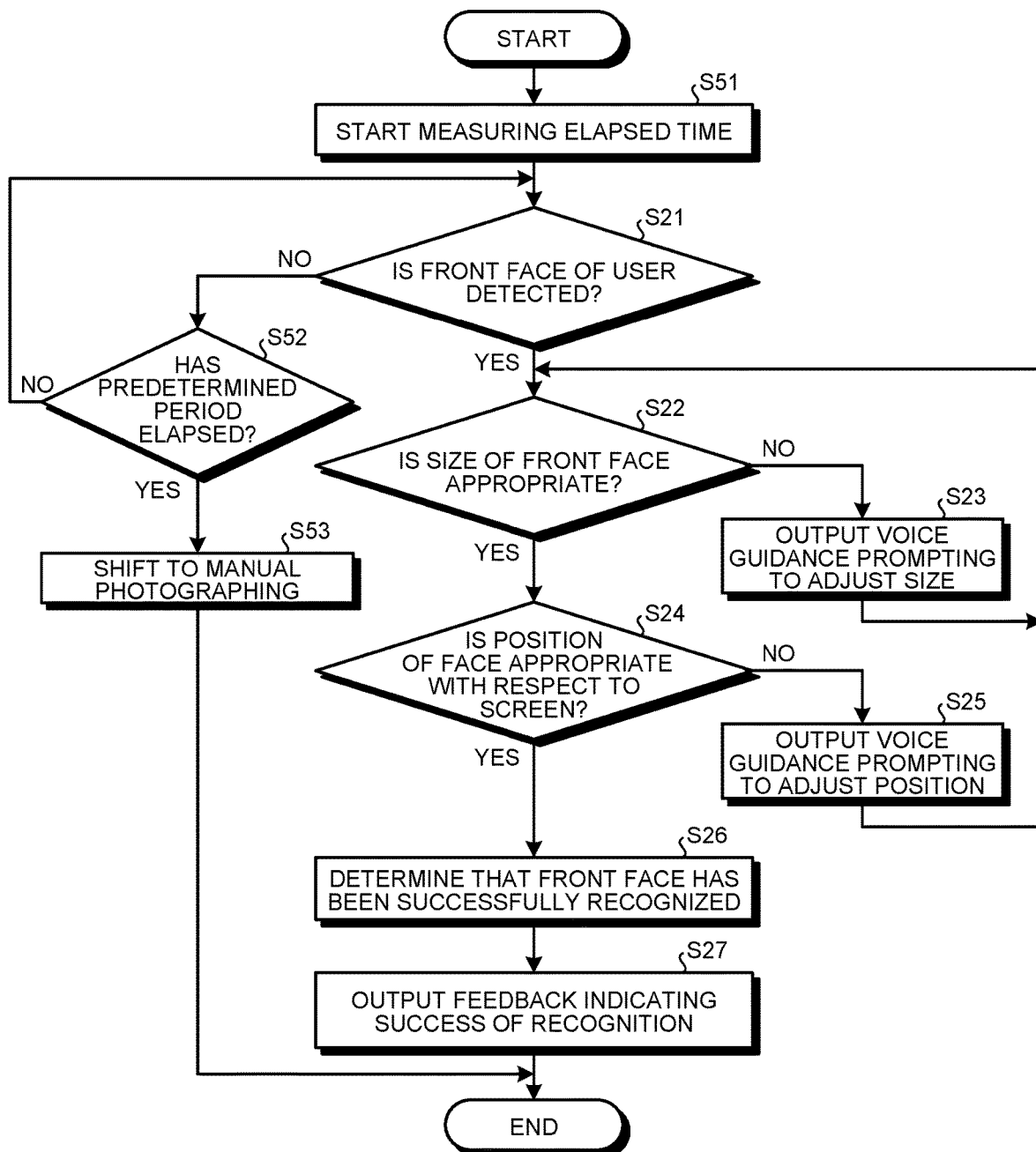
FIG. 9 is a flowchart (1) illustrating a modification of the procedure of the information processing according to the embodiment.

In FIG. 9, a modification of a procedure of a process in which the user terminal 10 executes the first determination process will be described. FIG. 9 is a flowchart (1) illustrating a modification of the flow of the information processing according to the embodiment.

As illustrated in FIG. 9, in the present modification, the user terminal 10 starts measuring elapsed time from the start of the present operation before executing the operation similar to the operation illustrated in FIG. 7 (step S51). Then, if the user terminal 10 has not been able to detect the user's front face within a predetermined period from the start of the measurement of elapsed time (step S21; No and step S52; Yes), the process shifts to the manual photographing operation (step S53), and the operation is ended. In other words, in the present modification, if the automatic photographing of an ear cannot be completed within the predetermined period (step S52; Yes), the process shifts to the manual photographing operation. Other operations may be similar to the operations illustrated in FIG. 7, and thus description thereof is omitted here.

Next, a modification of the procedure of the process in which the user terminal 10 photographs the user's ear will be described with reference to FIG. 10. FIG. 10 is a flowchart (2) illustrating a modification of the flow of the information processing according to the embodiment.

Figure 10:
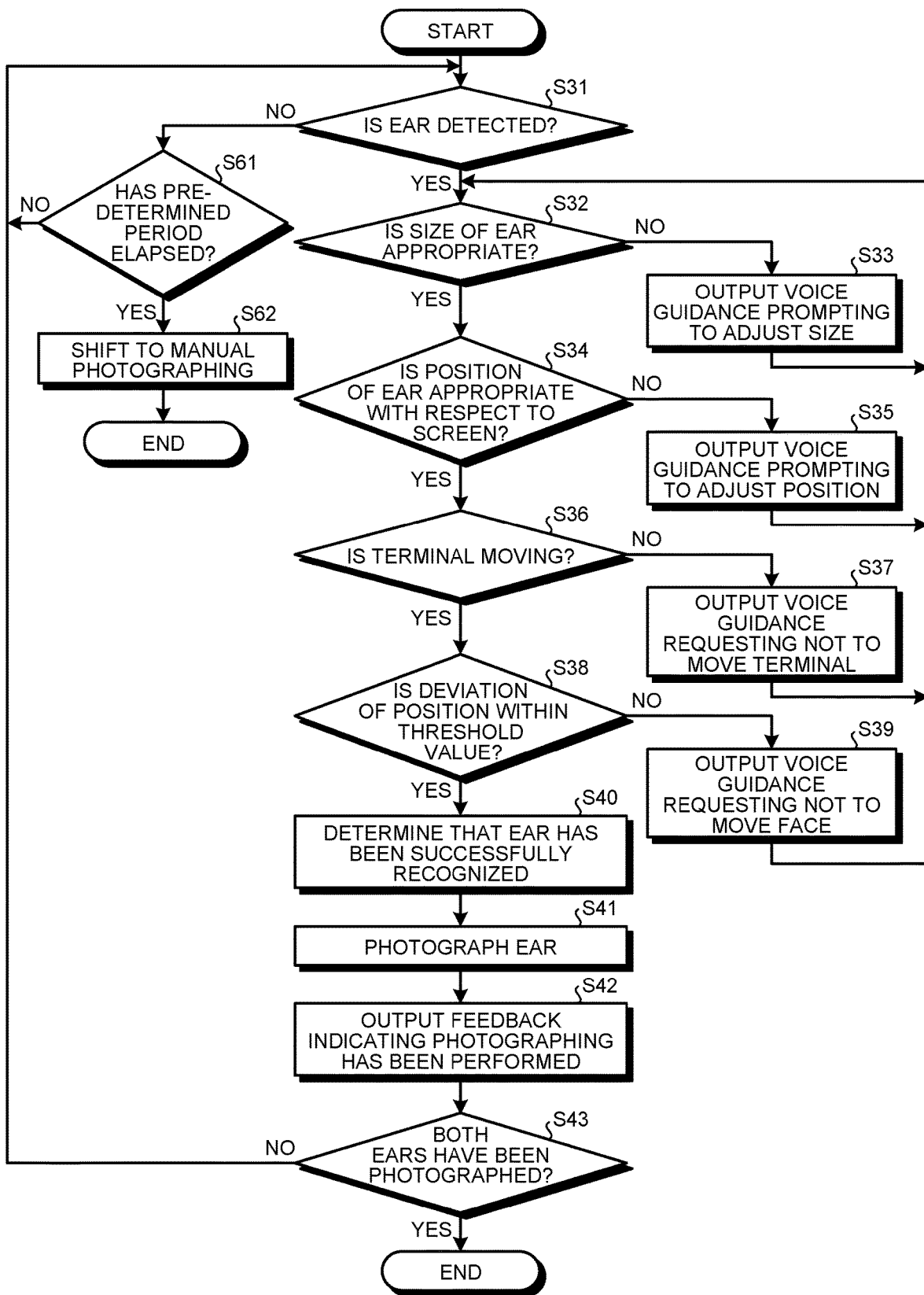
FIG. 10 is a flowchart (2) illustrating a modification of the procedure of the information processing according to the embodiment.

As illustrated in FIG. 10, in the present modification, in operations similar to the operations illustrated in FIG. 8, in a case where the user terminal 10 cannot detect the user's ear within a predetermined period after the start of the measurement of elapsed time in step S51 of FIG. 9 (step S31; No and step S61; Yes), the process shifts to the manual photographing operation (step S62), and this operation is ended. In other words, in the present modification, if the automatic photographing of an ear cannot be completed within the predetermined period (step S61; Yes), the process shifts to the manual photographing operation.

Note that the step of determining the shift to the manual photographing operation is not limited to the case where the ear cannot be detected in step S31 (step S31; No) and may be provided to cases such as a case where the size of the ear is not appropriate in step S32 (step S32; No), where the position of the ear with respect to the screen is not appropriate in step S34 (step S34; No), where the terminal is moving in step S36 (step S36; No), where the positional deviation is greater than the threshold value in step S38 (step S38; No), or where the ear has not been photographed in step S43 (step S43; No). Other operations may be similar to the operations illustrated in FIG. 8, and thus description thereof is omitted here.

Next, a procedure of a process in which the user terminal 10 photographs an ear by the user's manual operation will be described with reference to FIG. 11. FIG. 11 is a flowchart (3) illustrating a modification of the flow of the information processing according to the embodiment.

Figure 11:
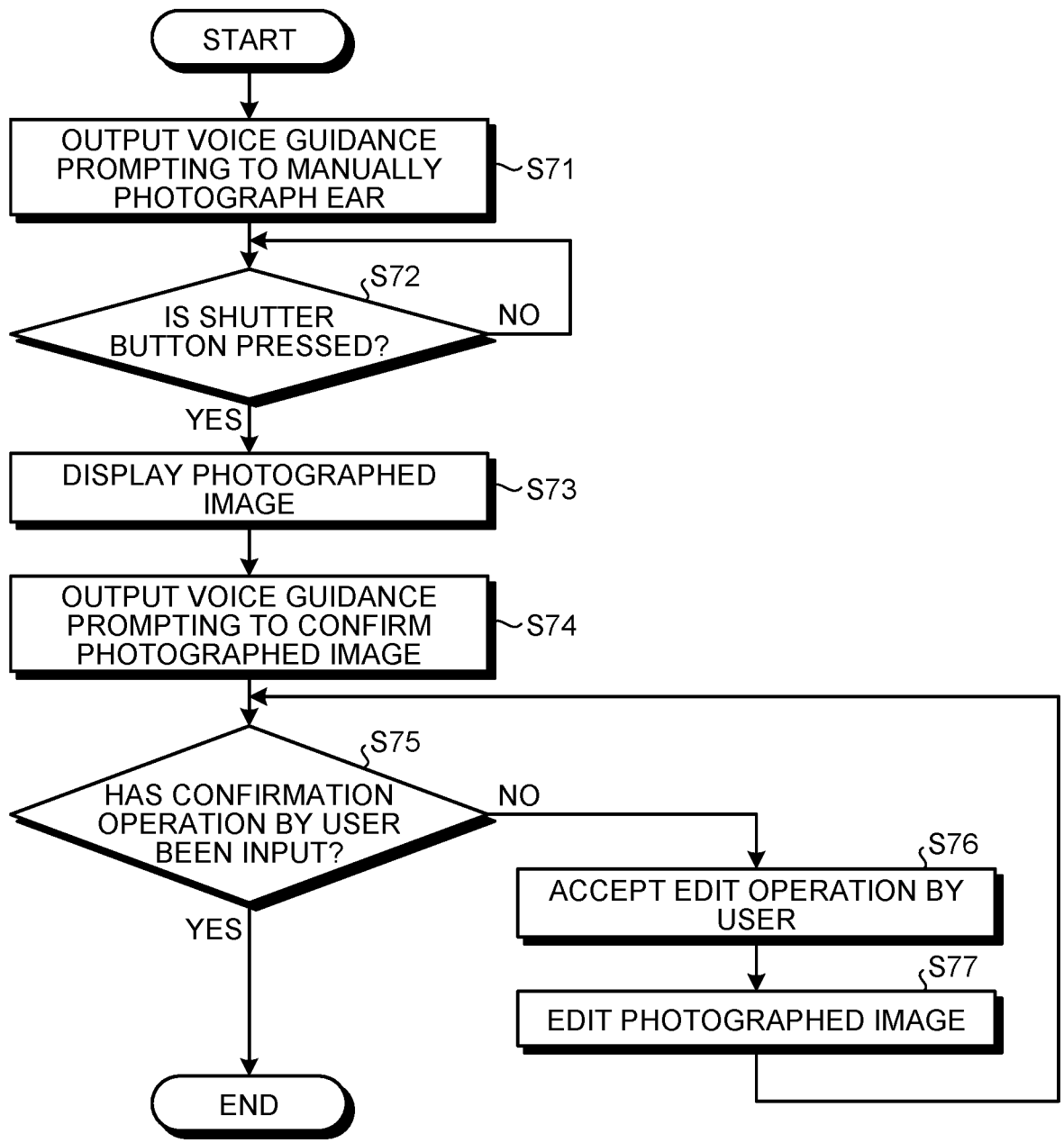
FIG. 11 is a flowchart (3) illustrating a modification of the procedure of the information processing according to the embodiment.

As illustrated in FIG. 11, when the manual ear photographing operation is activated in step S53 in FIG. 9, step S62 in FIG. 10, or the like, the user terminal 10 first outputs a response such as voice guidance prompting the user to manually photograph an ear (step S71).

Next, the user terminal stands by until a shutter button of the user terminal 10 is pressed by the user (step S72; No), and when the user presses the shutter button (step S72; Yes), the user terminal 10 displays the photographed image on the screen (step S73) and outputs a response such as voice guidance prompting the user to confirm the photographed image (step S74).

Next, the user terminal 10 determines whether or not an operation of confirming the photographed image by the user has been input (step S75). In addition, the user terminal 10 accepts an operation of editing the position, the size, or the inclination of the photographed image photographed by the user (step S76) before the confirmation operation by the user (step S75; No) is input and edits the photographed image in accordance with the operation content (step S77).

Then, when the confirmation operation by the user is input (step S75; Yes), the user terminal 10 ends the photographing process.

In the procedure exemplified in FIG. 11, for example, the user terminal 10 accepts an operation by the user such as adjusting the size or the position of an image of the user's ear manually photographed by the user (step S76) and adjusts the size or the position of the photographed image of the user's ear (step S77).

In this case, the user terminal 10 may provide information regarding user assistance. For example, the user terminal 10 provides the user with an appropriate image of an ear in advance as the content such as a web page displayed by a browser or application content. As a result, the user can adjust the size or the position of the photographed image of the user's ear by referring to the appropriate image of the ear. Note that the user assistance is not limited to provision of the content and may be, for example, user assistance by voice.

Then, the user terminal 10 ends the photographing process by accepting an operation corresponding to the end of the photographing as an operation by the user. Note that, here, the operation corresponding to the end of the photographing may be any operation. For example, when a photographing end button included by default in the manual photographing function is pressed by the user, the user terminal 10 ends the photographing process.

2. Modifications

The information processing system 1 described above may be implemented in various different forms other than the above embodiment. Therefore, a modification of the embodiment will be described below.

In the embodiment, an example in which the cloud server 100 generates the personal HRTF has been described. However, the personal HRTF may be generated by the user terminal 10 instead of the cloud server 100. In this case, the user terminal 10 includes a processing unit similar to the generation unit 132 illustrated in FIG. 6.

In the embodiment, it is presumed that the cloud server 100 is installed on a cloud network; however, without being limited to this example, the cloud server 100 may be installed on a network such as a local area network (LAN) as long as communication with the user terminal 10 is possible.

When generating a personal HRTF, the cloud server 100 may acquire identification information of the user, associate the identification information with the personal HRTF, and hold the personal HRTF.

In the embodiment, the cloud server 100 is described as a single server; however, the cloud server 100 may include a plurality of server devices. For example, the cloud server 100 may be divided into a generation server that generates a personal HRTF and a provision server that provides the personal HRTF.

In the embodiment, an example in which the user terminal 10 photographs the user has been described; however, the photographing may be performed by another photographing device. In this case, the photographing device sequentially transmits information of images to be photographed to the user terminal 10. Then, the user terminal 10 executes the information processing according to the embodiment by recognizing the position of the user's face or ear in the received image. Furthermore, in the embodiment, it has been described that the user terminal 10 performs the process of determining the size of the side face of the user; however, the user terminal 10 may skip the process of determining the size of the face and determine only the size of the ear. That is, the user terminal 10 does not necessarily determine the size or the position of the ear after determining the size of the user's side face but may directly determine the appropriateness of the size or the position of the user's ear if possible.

The user terminal 10 may set the amount of light of an image to be photographed, an allowable value of the inclination of the ear, and the like in accordance with a designation from the cloud server 100. As a result, the user terminal 10 can reduce the probability that an error is returned from the cloud server 100 that the personal HRTF cannot be generated from the photographed image.

3. Other Embodiments

The processes according to the above embodiments may be performed in various different embodiments other than the above embodiments.

Among the processes described in the above embodiments, all or a part of the processes described as those performed automatically can be performed manually, or all or a part of the processes described as those performed manually can be performed automatically by a known method. In addition, a process procedure, a specific name, and information including various types of data or parameters illustrated in the above or in the drawings can be modified as desired unless otherwise specified. For example, various types of information illustrated in the figures are not limited to information that has been illustrated.

In addition, each component of each device illustrated in the drawings is functionally conceptual and does not need to be necessarily physically configured as illustrated in the drawings. That is, a specific form of distribution and integration of each device is not limited to those illustrated in the figures, and all or a part thereof can be functionally or physically distributed or integrated in any unit depending on various loads, usage status, and the like.

In addition, the above embodiments and modifications can be combined as appropriate within a range where there is no conflict in the process content.

Furthermore, the effects described herein are merely examples and are not limiting, and other effects may be achieved.

4. Effects of Information Processing Device According to Present Disclosure

As described above, an information processing device (the user terminal 10 in the embodiment) according to the present disclosure includes a determination unit (the second determination unit 164 in the embodiment), a photographing unit (the photographing unit 165 in the embodiment), and a photographing control unit (the photographing control unit 166 in the embodiment). The determination unit determines whether or not the size of the area occupied by the user's side face is within a threshold value in a photographing area. In a case where it is determined that the size of the area occupied by the user's side face is within the threshold value, the photographing unit photographs the user's side face. In a case where the user's side face has not been photographed within a predetermined period, the photographing control unit presents a function of manually photographing to the user.

As described above, the information processing device according to the present disclosure can prompt the user to manually photograph the side of the head in a case where the user's side face has not been photographed within the predetermined period in the photographing area. With this configuration, it is possible to prevent the information processing device from returning to the initial stage of the photographing process that can occur since the user's side face cannot be determined and from falling into a processing loop of determining the user's front face and side face again, and thus it is possible to reduce the trouble or the burden of the user. Therefore, the information processing device can improve the convenience of the user regarding the photographing performed to calculate the head-related transfer function.

The determination unit also sets a second guide area for specifying the area occupied by the user's side face in the photographing area and determines whether or not the size of the area occupied by the user's side face with respect to the second guide area is within a threshold value. As a result, the information processing device can allow the user to intuitively understand at what size or position the face should be captured by the camera.

Furthermore, the determination unit determines whether or not an area including the user's ear, in the area extracted as the user's side face, is included in the photographing area and, in a case where the area including the user's ear is included in the photographing area, determines that the size of the area occupied by the user's side face is within the threshold value. As a result, the information processing device can reliably include the ear in the image to be photographed, and thus it is possible to acquire an image suitable for the generation process of the personal HRTF.

The determination unit also determines whether or not the area including the user's ear is included in the photographing area on the basis of a ratio at which the area including the user's ear is included in the photographing area. As a result, the information processing device can acquire an image including the ear having a size suitable for the generation process of the personal HRTF.

The determination unit further determines whether or not the area including the user's ear is included in the photographing area on the basis of a ratio at which the area including the user's ear occupies in the area occupied by the user's side face. As a result, the information processing device can acquire an image in which the size of the user's head and the size of the ear have a relationship suitable for HRTF generation.

Furthermore, the determination unit determines whether or not the area including the user's ear is included in the photographing area on the basis of the distance between an end of the area including the user's ear and an end of the photographing area. As a result, the information processing device can prevent photographing such an image from which the HRTF cannot be generated since the ear is located at an end of the image.

Furthermore, in a case where it is determined that the area including the user's ear, in the area extracted as the user's side face, is not included in the photographing area, the determination unit outputs a response instructing to move the position of the user's face or a response instructing to move the position of the device used for photographing the user. As a result, the information processing device can provide an appropriate response to the user and thus can perform photographing accurately and quickly.

In addition, the determination unit outputs at least one of voice, vibration, or display of a character string as a response. As a result, the information processing device can notify the user of an appropriate response even in a state where the user cannot visually recognize the screen.

Furthermore, the photographing unit photographs the user's side face in a case where it is determined the size of the area occupied by the user's side face is within the threshold value and then it is determined that the behavior amount of the device used for photographing of the user is within the threshold value. As a result, the information processing device can prevent photographing an image in which blurring has occurred.

Furthermore, the photographing unit photograph the user's side face in a case where it is determined that the size of the area occupied by the user's side face is within the threshold value and then it is determined that the movement amount of the user's side face in the photographing area is within the threshold value. As a result, the information processing device can prevent photographing an image in which blurring has occurred.

5. Hardware Configuration

Figure 12:
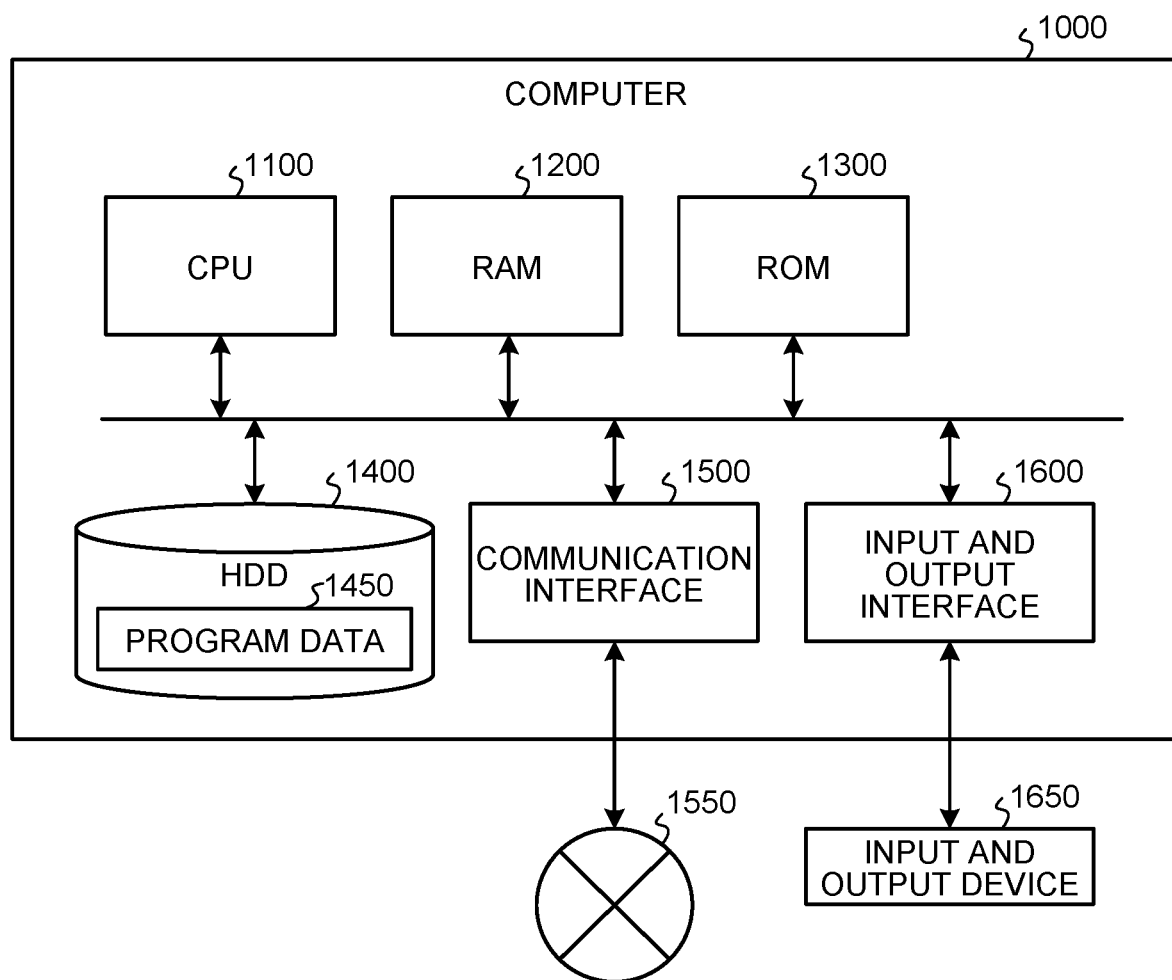
FIG. 12 is a hardware configuration diagram illustrating an example of a computer that implements functions of an information processing device.

The information devices such as the user terminal 10 and the cloud server 100 according to the embodiments described above are implemented by a computer 1000 having a configuration as illustrated in FIG. 12, for example. Hereinafter, the user terminal 10 according to the embodiment will be described as an example. FIG. 12 is a hardware configuration diagram illustrating an example of the computer 1000 that implements the functions of the user terminal 10. The computer 1000 includes a CPU 1100, a RAM 1200, a read only memory (ROM) 1300, a hard disk drive (HDD) 1400, a communication interface 1500, and an input and output interface 1600. The units of the computer 1000 are connected by a bus 1050.

The CPU 1100 operates in accordance with a program stored in the ROM 1300 or the HDD 1400 and controls each of the units. For example, the CPU 1100 loads a program stored in the ROM 1300 or the HDD 1400 in the RAM 1200 and executes processes corresponding to various programs.

The ROM 1300 stores a boot program such as a basic input output system (BIOS) executed by the CPU 1100 when the computer 1000 is activated, a program dependent on the hardware of the computer 1000, and the like.

The HDD 1400 is a computer-readable recording medium that non-transiently records a program to be executed by the CPU 1100, data used by the program, and the like. Specifically, the HDD 1400 is a recording medium that records an information processing program according to the present disclosure, which is an example of program data 1450.

The communication interface 1500 is an interface for the computer 1000 to be connected with an external network 1550 (for example, the Internet). For example, the CPU 1100 receives data from another device or transmits data generated by the CPU 1100 to another device via the communication interface 1500.

The input and output interface 1600 is an interface for connecting an input and output device 1650 and the computer 1000. For example, the CPU 1100 receives data from an input device such as a keyboard and a mouse via the input and output interface 1600. The CPU 1100 also transmits data to an output device such as a display, a speaker, or a printer via the input and output interface 1600. Furthermore, the input and output interface 1600 may function as a media interface that reads a program or the like recorded in a predetermined recording medium (medium). A medium refers to, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the user terminal 10 according to the embodiment, the CPU 1100 of the computer 1000 implements the functions of the control unit 16 or other units by executing an information processing program loaded on the RAM 1200. The HDD 1400 also stores an information processing program according to the present disclosure or data in the storage unit 15. Note that although the CPU 1100 reads the program data 1450 from the HDD 1400 and executes the program data 1450, as another example, the CPU 1100 may acquire these programs from another device via the external network 1550.

Note that the present technology can also have the following configurations.

(1)
An information processing device comprising:
a determination unit that determines whether or not a size of an area occupied by a side face of a user in a photographing area is within a threshold value;
a photographing unit that photographs the side face of the user in a case where it is determined that the size of the area occupied by the side face of the user is within the threshold value; and
a photographing control unit that presents a function of manually photographing to the user in a case where the side face of the user has not been photographed within a predetermined period.

(2)
The information processing device according to (1),
wherein the determination unit
sets a guide area for specifying the area occupied by the side face of the user in the photographing area and determines whether or not the size of the area occupied by the side face of the user with respect to the guide area is within a threshold value.

(3)
The information processing device according to (1) or (2),
wherein the determination unit
determines whether or not an area including an ear of the user in an area extracted as the side face of the user is included in the photographing area extracted as the side face of the user and, in a case where the area including the ear of the user is included in the photographing area, determines that the size of the area occupied by the side face of the user is within the threshold value.

(4)

The information processing device according to (3), wherein the determination unit determines whether or not the area including the ear of the user is included in the photographing area on a basis of a ratio at which the area including the ear of the user is included in the photographing area.

(5)

The information processing device according to (3) or (4), wherein the determination unit determines whether or not the area including the ear of the user is included in the photographing area on a basis of a ratio at which the area including the ear of the user occupies in the area occupied by the side face of the user.

(6)

The information processing device according to any one of (3) to (5), wherein the determination unit determines whether or not the area including the ear of the user is included in the photographing area on a basis of a distance between an end of the area including the ear of the user and an end of the photographing area.

(7)

The information processing device according to any one of (3) to (6), wherein, in a case where it is determined that the area including the ear of the user in the area extracted as the side face of the user is not included in the photographing area, the determination unit outputs a response instructing to move a position of the face of the user or a response instructing to move a position of a device used for photographing the user.

(8)

The information processing device according to (7), wherein the determination unit outputs at least one of voice, vibration, or display of a character string as the response.

(9)

The information processing device according to any one of (1) to (8), wherein the photographing unit photographs the side face of the user in a case where it is determined that the size of the area occupied by the side face of the user is within the threshold value and then it is determined that a behavior amount of a device used for photographing of the user is within a threshold value.

(10)

The information processing device according to any one of (1) to (9), wherein the photographing unit photographs the side face of the user in a case where it is determined that the size of the area occupied by the side face of the user is within the threshold value and then it is determined that a movement amount of the side face of the user in the photographing area is within a threshold value.

(11)

An information processing method, by a computer, comprising:

determining whether or not a size of an area occupied by a side face of a user in a photographing area is within a threshold value;

photographing the side face of the user in a case where it is determined that the size of the area occupied by the side face of the user is within the threshold value; and presenting a function of manually photographing to the user in a case where the side face of the user has not been photographed within a predetermined period.

(12)

An information processing program for causing a computer to function as:

a determination unit that determines whether or not a size of an area occupied by a side face of a user in a photographing area is within a threshold value;

a photographing unit that photographs the side face of the user in a case where it is determined that the size of the area occupied by the side face of the user is within the threshold value; and a photographing control unit that presents a function of manually photographing to the user in a case where the side face of the user has not been photographed within a predetermined period.

REFERENCE SIGNS LIST

1 INFORMATION PROCESSING SYSTEM
10 USER TERMINAL
11 COMMUNICATION UNIT
12 INPUT UNIT
13 DISPLAY UNIT
14 DETECTION UNIT
15 STORAGE UNIT
16 CONTROL UNIT
161 ACQUISITION UNIT
162 PHOTOGRAPHING PROCESSING UNIT
163 FIRST DETERMINATION UNIT
164 SECOND DETERMINATION UNIT
165 PHOTOGRAPHING UNIT
166 PHOTOGRAPHING CONTROL UNIT
167 TRANSMISSION UNIT
168 RECEPTION UNIT
100 CLOUD SERVER

The invention claimed is:

1. An information processing device, comprising:

a processor; and a memory to store instructions that, when executed by the processor, cause the processor to:

determine whether or not a position of a body part of a user is located within a guide frame in a photographing area;

determine whether or not a movement amount of the position of the body part of the user in the photographing area is within a threshold value;

automatically capture an image of the body part of the user in a case where the position of the body part of the user is located within the guide frame in the photographing area and the movement amount of the position of the body part of the user in the photographing area is within the threshold value;

receive an operation by the user to redo capturing the image of the body part of the user in a case where the image of the body part of the user has not been automatically captured within a predetermined period; and receive a head-related transfer function calculated based on the captured image of the body part of the user and a learned model.

2. The information processing device according to claim 1, wherein the processor is further caused to acquire the head-related transfer function based on an output of a learned model that has been trained to determine a relationship between data related to the body part of the user and the head-related transfer function.

3. The information processing device according to claim 2, wherein the head-related transfer function is acquired using a two-dimensional image or a three-dimensional image of the body part of the user.

4. The information processing device according to claim 2, wherein the learned model is based on a neural network, a support vector machine, clustering, or reinforcement learning.

5. The information processing device according to claim 1, wherein the processor is further caused to present an option to the user to acquire data related to the body part of the user based on information that the data related to the body part of the user has not been acquired within a predetermined time.

6. The information processing device according to claim 1, wherein the body part of the user is an ear of the user.

7. The information processing device according to claim 6, wherein the processor is further caused to determine whether or not a size of an area occupied by the ear of the user is included in the photographing area based on a ratio at which the size of the area occupied by the ear of the user is included in the photographing area.

8. A method, comprising:
   determining, by a processor, whether or not a position of body part of a user is located within a guide frame in a photographing area;
   determining, by the processor, whether or not a movement amount of the position of the body part of the user in the photographing area is within a threshold value;
   automatically capturing, by the processor, an image of the body part of the user in a case where the position of the body part of the user is located within the guide frame in the photographing area and the movement amount of the position of the body part of the user in the photographing area is within the threshold value;
   receiving, by the processor, an operation by the user to redo capturing the image of the body part of the user in a case where the image of the body part of the user has not been automatically captured within a predetermined period; and
   receiving, by the processor, a head-related transfer function calculated based on the captured image of the body part of the user and a learned model.

9. The method according to claim 8, further comprising acquiring the head-related transfer function based on an output of a learned model that has been trained to determine a relationship between data related to the body part of the user and the head-related transfer function.

10. The method according to claim 9, wherein the head-related transfer function is acquired using a two-dimensional image or a three-dimensional image of the body part of the user.

11. The method according to claim 9, wherein the learned model is based on a neural network, a support vector machine, clustering, or reinforcement learning.

12. The method according to claim 8, further comprising presenting an option to the user to acquire data related to the body part of the user based on information that the data related to the body part of the user has not been acquired within a predetermined time.

13. The method according to claim 8, wherein the body part of the user is an ear of the user.

14. The method according to claim 13, further comprising determining whether or not a size of an area occupied by the ear of the user is included in the photographing area based on a ratio at which the size of the area occupied by the ear of the user is included in the photographing area.

15. A non-transient computer-readable recording medium storing instructions that when executed by a processor, cause the processor to:
   determine whether or not a position of a body part of a user is located within a guide frame in a photographing area;
   determine whether or not a movement amount of the position of the body part of the user in the photographing area is within a threshold value;
   automatically capture an image of the body part of the user in a case where the position of the body part of the user is located within the guide frame in the photographing area and the movement amount of the position of the body part of the user in the photographing area is within the threshold value;
   receive an operation by the user to redo capturing the image of the body part of the user in a case where the image of the body part of the user has not been automatically captured within a predetermined period; and
   receive a head-related transfer function calculated based on the captured image of the body part of the user and a learned model.

16. The non-transient computer-readable recording medium according to claim 15, wherein the processor is further caused to acquire the head-related transfer function based on an output of a learned model that has been trained to determine a relationship between data related to the body part of the user and the head-related transfer function.

17. The non-transient computer-readable recording medium according to claim 16, wherein the head-related transfer function is acquired using a two-dimensional image or a three-dimensional image of the body part of the user.

18. The non-transient computer-readable recording medium according to claim 16, wherein the learned model is based on a neural network, a support vector machine, clustering, or reinforcement learning.

19. The non-transient computer-readable recording medium according to claim 15, wherein the processor is further caused to present an option to the user to acquire data related to the body part of the user based on information that the data related to the body part of the user has not been acquired within a predetermined time.

20. The non-transient computer-readable recording medium according to claim 15, wherein the body part of the user is an ear of the user.

* * * * *